United States Patent
Sanford

[15] 3,648,105
[45] Mar. 7, 1972

[54] SINGLE-CONDUCTOR ARRANGEMENT FOR POWERING AND TRIGGERING FLASHLAMPS

[72] Inventor: Douglas C. Sanford, Princeton Township, Mille Lacs, Minn.

[73] Assignee: Honeywell Inc., Minneapolis, Minn.

[22] Filed: Sept. 9, 1969

[21] Appl. No.: 856,435

[52] U.S. Cl. .................... 315/237, 315/200 A, 315/209 R, 315/228, 315/241 R, 340/81 R
[51] Int. Cl. ........................................................ H05b 41/34
[58] Field of Search ................ 315/209, 210, 227, 228, 237, 315/238, 241, 77, 217, 312, 320, 321, 326, 200 A; 340/81, 83

[56] References Cited

UNITED STATES PATENTS

| | | | |
|---|---|---|---|
| 2,186,013 | 1/1940 | Edgerton | 315/237 X |
| 2,351,603 | 6/1944 | Edgerton | 315/238 X |

*Primary Examiner*—Raymond F. Hossfeld
*Attorney*—Charles J. Ungemach, Ronald R. Reiling and George W. Field

[57] ABSTRACT

A circuit for energizing all the flashing lights of an aircraft recognition light system on a single wire from a central controller even though the lights do not all flash at the same time: at the central controller the AC for the lights is broken up into blocks or bursts spaced by one-fifth their own duration, all the blocks being transmitted on the single wire to all the light units, and the lights being flashed selectively at the beginnings or the endings of the blocks.

9 Claims, 6 Drawing Figures

Patented March 7, 1972

INVENTOR.
DOUGLAS C. SANFORD
BY *George W. Ould*
ATTORNEY

Patented March 7, 1972

INVENTOR.
DOUGLAS C. SANFORD

BY George W. Field

ATTORNEY

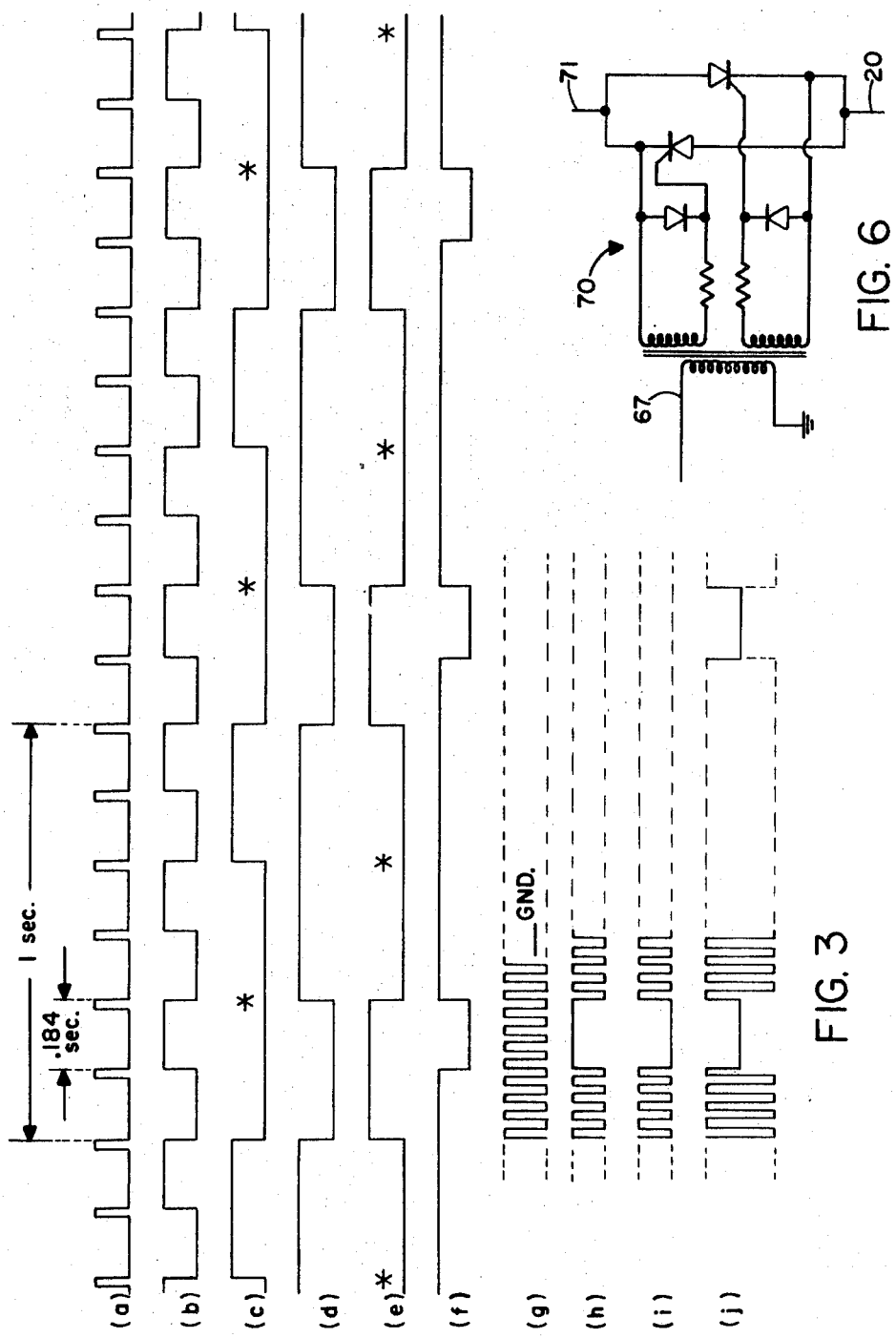

SINGLE-CONDUCTOR ARRANGEMENT FOR POWERING AND TRIGGERING FLASHLAMPS

FIELD OF THE INVENTION

This invention relates to the field of control apparatus, and more particularly to apparatus for controlling the operation of recognition or safety lights used on an aircraft to warn other aircraft of its presence in the area.

BACKGROUND OF THE INVENTION

It is known to provide aircraft with a plurality of lights visible from predetermined directions and flashing at different rates, so that a remote observer may appreciate the relative direction of movement of the aircraft. In such systems, however, it has been necessary heretofore to provide both a power cable and a control cable from a central controller to each light unit. The weight of cable required becomes significant in modern large aircraft.

SUMMARY OF THE INVENTION

My invention comprises means for delivering electrical power from a suitable source to a plurality of lamp units in bursts spaced by intervals which are a predetermined portion of the length of the bursts, together with means for triggering operation of each of the lamps selectively at the beginning or the end of each bust, so that a single wire is sufficient both to supply power and to trigger its use in flashing the lamps at appropriate instants.

It is accordingly a principal object of the invention to provide an improved control arrangement for flashing aircraft lights. A more specific object is to provide such a system in which plural lights located near to or spaced from one another can be interconnected by a common conductor leading to a remote central control unit or assembly, the voltage on the common conductor supplying both the power for the flashing discharge and the trigger for initiating it.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of my invention.

DESCRIPTION OF THE PREFERRED EMBODIMENT

Figure 1:
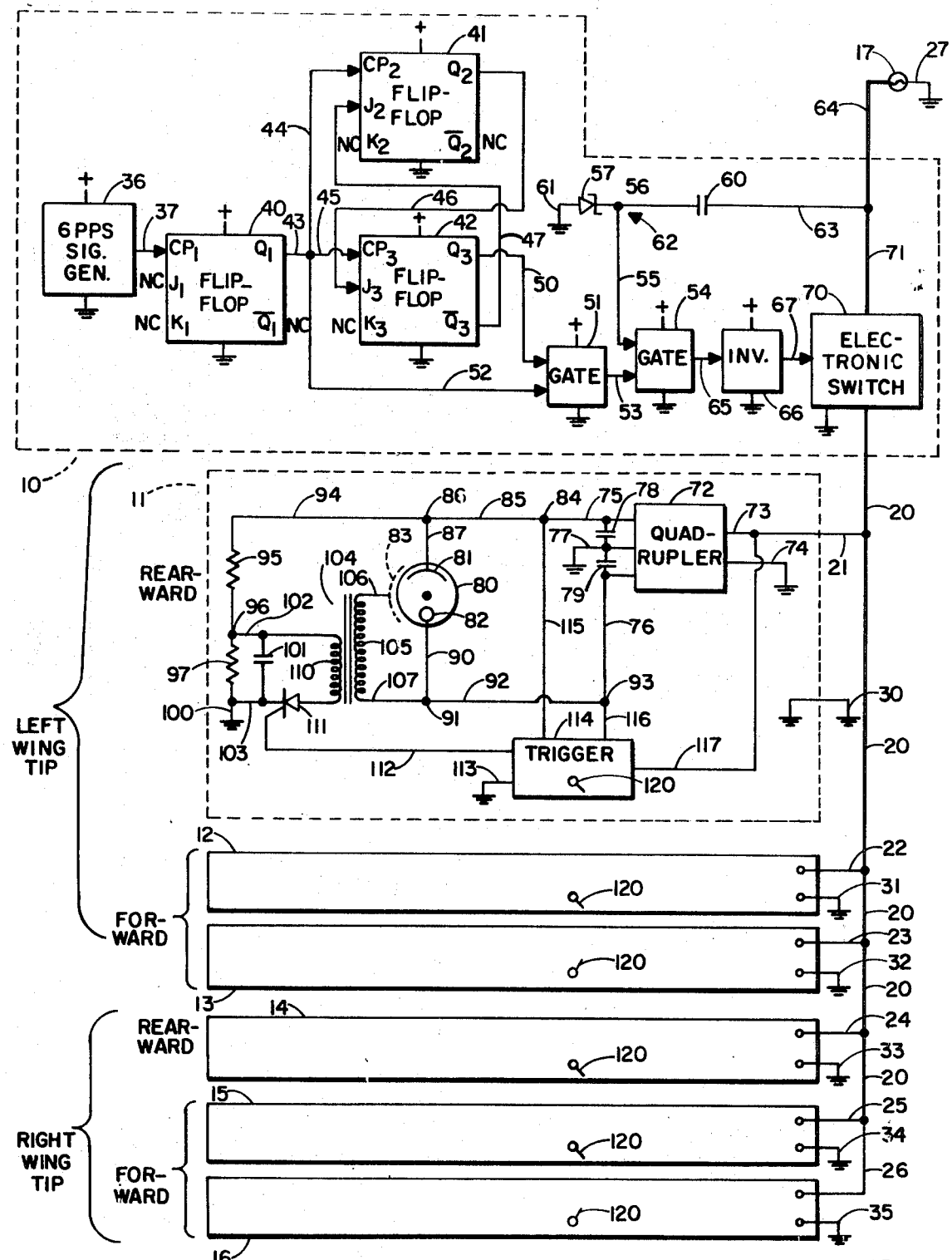
FIG. 1 is a block diagram of my new system.

Turning now to FIG. 1, my system is shown to comprise a central control unit or assembly 10 and a plurality of utilization devices such as lamp units 11, 12, 13, 14, 15, and 16. Unit 10 controls the flow of power from a source 17 of 400 Hz. alternating voltage to a conductor 20 to which the lamp units are all connected, by conductors 21, 22, 23, 24, 25, and 26 respectively, the return path being provided by ground connections 27, 30, 31, 32, 33, 34, and 35, respectively.

In control assembly 10 a signal generator 36 energized from a suitable DC source not shown operates to supply positive pulses at a repetition rate of 6 per second through a conductor 37 to the input terminal $CP_1$ of the first of three flip-flops 40, 41, and 42 energized from the DC source. These are preferably of the type known as "J-K flip-flops," and are identified by the commercial designation 9093: each flip-flop has an input terminal CP, a pair of output terminals Q and $\bar{Q}$, and a pair of control terminals J and K. The state of the flip-flop is arbitrarily denoted as 0 when the Q output is high and the $\bar{Q}$ output is low: it is denoted as 1 when the Q output is low and the $\bar{Q}$ output is high. When both the J and K terminals are open or are positive, each positive input pulse reverses the state of the flip-flop, toggling taking place on the trailing edges of the input pulses. If the J terminal is coupled to a low voltage, input pulses can drive the flip-flop into but not out of the 0 state, while if the K terminal is coupled to a low voltage, input pulses can drive the flip-flop into but not out of the 1 state.

FIG. 1 shows the $Q_1$ output of flip-flop 40 to be connected by conductor 43 and conductors 44 and 45 to the input terminals $CP_2$, $CP_3$ of flip-flops 41 and 42 respectively. No outputs are taken from $\bar{Q}_1$ and $\bar{Q}_2$, and no inputs are supplied to terminals $J_1$, $K_1$, $K_2$, or $K_3$. An output from $Q_2$ of flip-flop 41 is supplied on conductor 46 to terminal $J_3$ of flip-flop 42, an output from $\bar{Q}_3$ of flip-flop 42 is supplied on conductor 47 to terminal $J_2$ of flip-flop 41.

The output from $Q_3$ is supplied on conductor 50 as one input to a NAND-gate 51, the other input to which is obtained from the output $Q_1$ of flip-flop 40 through conductors 43 and 52. The output of NAND-gate 51 is supplied on conductor 53 as one input to a NAND-gate 54, which receives a second input on conductor 55 from the junction point 56 between the cathode of a zener diode 57 and one terminal of a phasing capacitor 60. The anode of diode 57 is grounded at 61, and the series circuit 62 including the diode and the capacitor is connected to source 17 through conductors 63 and 64.

The output of gate 54 is supplied through conductor 65, an inverter 66, and conductor 67 to control the operation of an electronic switch 70 which enables the flow of alternating voltage from source 17 through conductors 64 and 71 to conductor 20. Gates 51 and 54 and inverter 66 are energized from the DC source.

Members 11, 12, 13, 14, 15, and 16 are all alike, and only the first is shown in detail. A voltage quadrupler 72 is energized through conductors 21 and 73 and ground connection 74, and supplies an output voltage on conductors 75 and 76, centered with respect to a ground connection 77, which is roughly four times the input voltage, and which charges a pair of discharge capacitors 78 and 79 with their upper terminals positive. A utilization device in the form of a gaseous discharge lamp 80 is shown to have an internal anode 81, and internal cathode 82, and an external control electrode 83: its energizing circuit may be traced from quadrupler 72 through conductor 75, junction point 84, conductor 85, junction point 86, conductor 87, lamp 80, conductor 90, junction point 91, conductor 92, and junction point 93 to conductor 76.

A further circuit energized by quadrupler 72 may be traced from junction point 86 through conductor 94, a resistor 95, junction point 96, a resistor 97, and ground connections 100 and 77. A trigger capacitor 101 is connected across resistor 97 by conductors 102 and 103, and is thus charged to the voltage drop across resistor 97. A stepup transformer 104 has its secondary winding 105 connected by conductor 106 to electrode 83 and by conductor 107 to junction point 91: its primary winding 110 is connected, in series with a silicon controlled rectifier 111, across capacitor 101 so that when rectifier 111 conducts, capacitor 101 may discharge through primary winding 110.

Rectifier 111 is controlled through a conductor 112 and ground connections 113 and 100 from a trigger 114 having input conductors 115 and 116 connected to junction points 84 and 93, and a further input conductor 117 connected through conductor 21 to conductor 20.

Figures 2, 4, 5:
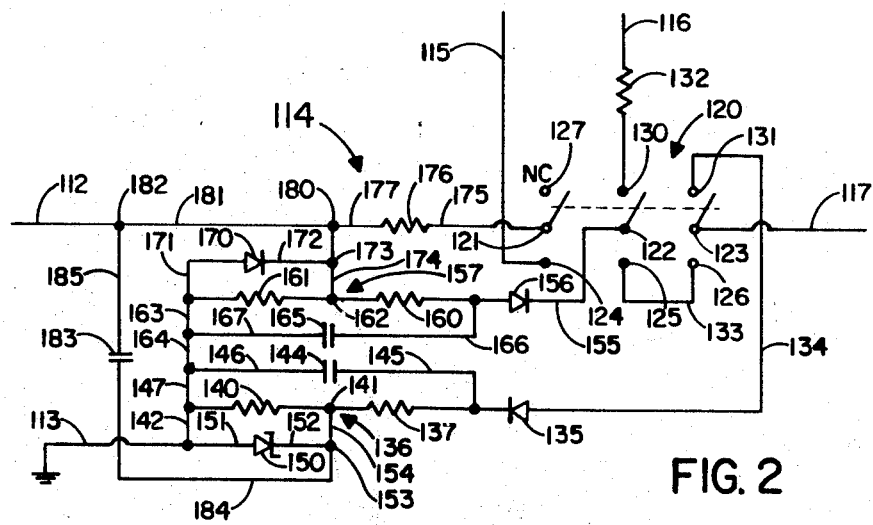
FIG. 2 gives details of a trigger usable to cause its associated light to flash either at the end or the beginning of a burst of AC, FIG. 3 gives various waveforms of interest in understanding the invention.
FIGS. 4 and 5 show a preferred mode of installing the invention in aircraft, and FIG. 6 gives details of one electronic switch suitable for use in my invention.

As best shown in FIG. 2, trigger 114 comprises a resistance-capacitance-diode network associated with a three-pole double-throw switch 120 having movable contacts 121, 122, and 123 unitarily operable into engagement either with a first set of fixed conducts 124, 125, and 126, or with a second set of fixed conducts 127, 130, and 131. Switch contact 124 is connected to conductor 115, switch contact 123 is connected to conductor 117, switch contact 130 is connected through a resistor 132 to conductor 116, and switch contacts 125 and 126 are interconnected by a conductor 133.

Switch contact 131 is connected through conductor 134 a diode 135, a series circuit 136 made up of a pair of resistors 137 and 140 having a junction point 141, and conductor 142 to ground connection 113. A capacitor 144 is shunted across series circuit 136 by conductor 145 and by conductors 146 and 147, and a zener diode 150 is shunted across resistor 140 by conductors 142 and 151 and by conductor 152, junction point 153 and conductor 154.

Switch contact 122 is connected through conductor 155, a diode 156, a series circuit 157 made up of a pair of resistors 160 and 161 having a junction point 162, and conductors 163, 164, 147, and 142 to ground connection 113. A capacitor 165 is shunted across series circuit 157 by conductor 166 and by conductors 163 and 167, and a diode 170 is shunted across resistor 161 by conductor 171 and by conductor 172, junction point 173, and conductor 174.

Switch contact 121 is connected through conductor 175, a resistor 176, conductor 177, junction point 180, conductor 181, and junction point 182 to conductor 112. A capacitor 183 is connected between junction points 153 and 182 by conductors 184 and 185.

Turning now to FIGS. 4 and 5, it will be seen that control unit 10 is mounted at a convenient location in the fuselage of an aircraft, and that lamp units 11, 12, and 13 are mounted at the left wingtip while lamp units 14, 15, and 16 are mounted at the right wingtip. The units are connected together by the single conductor 20 of FIG. 1, the return path being completed through the frame of the aircraft. Unit 12 is mounted above unit 13, and both are visible through the forward angle 186: unit 11 is visible through the rearward angle 187. Unit 15 is mounted above unit 16 and both are visible through the forward angle 190: unit 14 is visible through the rearward angle 191. Units 11, 12, 14, and 15 are all to flash at the same time, so that switches 120 in these units are thrown downwardly. Units 13 and 16 are to flash simultaneously, but at a different time from the other four lamps, and switches 120 in these lamp units are thrown upwardly.

In one successful embodiment of the invention the following values were found satisfactory.

| Resistor | Capacitor | Semiconductor |
|---|---|---|
| 95–45 K. | 60–0.05 μf. | 57–1N751(5v.) |
| 97–68 K. | 78–640 μf. | 111–2N2327 |
| 132–60 K. | 79–640 μf. | 135–1N645 |
| 137–40 K. | 101–0.22 μf. | 150–1N645 |
| 140–10 K. | 144–0.1 μf. | 156–1N645 |
| 160–2 K. | 165–0.1 μf. | 170–(10v.) |
| 161–40 K. | 183–1 f. | |
| 176–100 K. | | |

OPERATION

The operation of the system will now be described with the further aid of waveforms shown in FIG. 3. When power is applied to the system, generator 36 supplies positive pulses, as shown in curve ($a$), to flip-flop 40 at a rate of 6 pulses per second. The trailing edge of each pulse triggers the flip-flop to toggle, so that an output $Q_1$ appears on conductors 43, 44, 45, and 52 in the form of a square wave, curve ($b$), having half the period of the generator. The trailing edges of the $Q_1$ pulses would ordinarily trigger flip-flops 41 and 42 to supply a further pair of square wave outputs of redoubled period, but this action is modified by signals on conductors 46 and 47. Curve ($c$) represents the actual $Q_2$ output, curve ($d$) represents the $\bar{Q}_3$ output, and curve ($e$) represents the $Q_3$ output. At the times indicated by asterisks in curve ($c$) flip-flop 41 is disabled from triggering by a signal on $J_2$ from $\bar{Q}_3$, and at the times indicated by asterisks in curve ($e$) flip-flop 42 is disabled from triggering by a signal at $J_3$ from $Q_2$.

Curve ($f$) shows the waveform at conductor 53: gate 51 has a positive output except when both the $Q_1$ and the $Q_3$ signals to the gate are positive. The gate output is thus made of positive, five-sixth second long pulses having interpulse spaces one-sixth second in duration, and this comprises one input to gate 54. The second input to gate 54 is supplied through conductor 55 and is shown in curve ($g$) to comprise a square wave having a frequency of 400 Hz. Curve ($h$) shows the output of gate 54 as a result of these two inputs, curve ($i$) shows how this output is inverted to give at 67 a wave having intervals of zero direct voltage between trains of positive pulses of 400 p.p.s. repetition frequency. This acts in electronic switch 70 to supply on conductor 20 a wave form shown in curve ($j$). When such a wave is applied to the primary of the transformer in electronic switch 70, each pulse results in a pair of pulses of opposite polarity in the transformer secondaries, one due to the rise of the magnetic field and the other due to its decay. This is commonly referred to as removal of the DC component of the primary voltage, and is a well-known phenomonon. The transformer outputs are five-sixth second bursts of alternating voltage of the frequency of source 17, spaced by one-sixth second intervals. Capacitor 60 is so chosen to give a preferred phase angle between the 400 p.p.s. component of curve ($i$) and the 400 Hz. supplied at source 17, since the load on conductor 20 is essential capacitive.

The operation of electronic switch 70 is conventional. The positive-going pulses on curve $j$ are in phase (by reason of capacitor 60) with the positive half-cycles of source 17, and for these halves the right-hand silicon-controlled rectifier of FIG. 6 is enabled, to pass current from conductor 71 to conductor 20. Similarly the negative going pulses on curve $j$ are in phase with the negative half-cycles of source 17, and for these halves the left-hand silicon-controlled rectifier is enabled, to pass current from conductor 20 to conductor 71. Thus as long as gate 54 is enabled by signal 53, periods of the source 17 are passed by the switch to give bursts of alternating voltage.

When voltage as shown in curve $j$ reaches each of lamp units 11, 12, 14, and 15, quadrupler 72 (FIG. 1) begins to charge capacitors 78 and 79, and diode 156 (FIG. 2) begins to charge capacitor 165 through conductors 21 and 117, switch contacts 123 and 126, conductor 133, switch contacts 125 and 122 and conductor 155. Since capacitor 165 is much smaller than capacitor 78, it charges more rapidly, forward-biasing diode 170 to produce a slight negative voltage on the control element of rectifier 111 to maintain its cutoff. As capacitor 78 charges current flows through conductor 115, switch contacts 124 and 121, conductor 175, resistor 176, conductor 177, and thence through diode 170, which in its forward-biassed condition acts as a low-impedance path to ground. Capacitor 101 is simultaneously being charged through resistor 95. This condition until the end of the train of high-frequency path. Capacitor 165 then discharges rapidly, removing the forward bias on diode 170, which becomes nonconductive and isolates resistor 176 from ground. The full-positive voltage on capacitor 78 reaches the control electrode of rectifier 111, triggering the discharge of capacitor 101 through primary winding 110. This in turn creates a secondary voltage sufficiently high to at least partially ionize the gas in lamp 80, to the point where a luminous avalanche discharge between electrodes 81 and 82 reduces the voltage across capacitors 78 and 79 below the extinction value of lamp 80. Thereupon the discharge ceases and the process repeats itself.

When the voltage as shown in curve ($j$) reaches each of lamp units 13 and 16, in which switches 120 are thrown upwardly capacitor 144 is rapidly charged positively from conductor 20 through conductors 21 and 117, switch contacts 123 and 131, conductor 134, and diode 135. A regulated portion of this charge appears at the cathode of zener diode 150 and is transferred through capacitor 183 to the cathode of diode 170 and the control electrode of rectifier 111. However, capacitors 78, 79, and 101 have not yet charged appreciably and no discharge of rectifier 111 or lamp 80 occurs. Quadrupler 72 begins to charge capacitors 78, 79 and 101, and capacitor 165 charges from capacitor 79 through conductors 76 and 116, resistance 132, switch contacts 130 and 122, conductor 155, and diode 156, driving the control electrode of rectifier 111 negative through resistor 160 and conductors 174, 181, and 112. When the high-frequency component ceases, capacitors 144 and 183 can discharge to ground through resistors 137 and 140, but the negative charge on capacitor 165 is substantially maintained by capacitor 79. There is thus no lamp discharge at this time. However, when the next burst of alternating voltage begins capacitor 144 again charges rapidly, and again a portion of this positive charge appears at the cathode of zener diode 150 and is transmitted through capacitor 183. The negative voltage due to capacitor 165 is overcome thereby, the control electrode of rectifier 111 is driven positive, and capacitors 101, 78, and 79 discharge to produce a flash of light, after which the process is again repeated.

From the foregoing will be apparent that by my apparatus a single conductor is sufficient to supply both power and control to a plurality of light units, so that they cyclically flash, in selected groups, and at different instants selected by switches 120 to occur at the beginnings and the ends respectively of the bursts of alternating voltage on conductor 20.

Numerous objects and advantages of my invention have been set forth in the foregoing description, together with details of the structure and function of the invention, and the novel features thereof are pointed out in the appended claims. The disclosure, however, is illustrative only and I may make changes in detail, especially in matters of shape, size and arrangements of parts, within the principle of the invention.

I claim as my invention:

1. In combination:

A source of alternating voltage of a selected frequency;

means connected to said source for supplying therefrom a train of spaced bursts of alternating voltage of said frequency;

a pair of utilization devices; and means connected to the last-named means and to the utilization devices for selectively actuating said devices at the beginning and the end respectively of each of said bursts.

2. In combination:

means producing a single train of spaced bursts of alternating electrical energy;

a plurality of utilization devices;

means initiating energization of one of said devices at the end of each burst of said train; and means initiating energization of another of said devices at the beginning of each burst of said train.

3. In combination:

means producing a single train of spaced pulses of electrical energy;

a plurality of light-emitting discharge devices;

means connected to the first-named means and to at least a first of said discharge devices for initiating discharge of that device at the end of each pulse of said train; and means connected to the first-named means and to at least a second of said discharge devices for initiating discharge of that device at the beginning of each pulse of said train.

4. Apparatus according to claim 3 together with means mounting the first and second devices so as to be visible from the same direction.

5. Apparatus according to claim 3 together with means mounting the first and second devices so as to be visible from different directions.

6. In combination:

means supplying a train of spaced bursts of alternating voltage, the repetion rate of said train being long with respect to the period of said voltage;

a discharge device having principal electrodes and a control electrode;

primary energy storage means connected across the principal electrodes of said discharge device;

means incrementally charging said storage means during successive cycles of each said burst, to a final level nearly sufficient to initiate discharge of said device;

interruptable means connecting said primary energy storage means to the control electrode of said discharge means to initiate discharge in said device; and means interrupting the operation of the connecting means for only as long as a burst of said alternating voltage continues, so that at the end of each said burst said connections is completed and discharge of said principal storage means through said discharge means takes place.

7. Apparatus according to claim 1 in which each of said utilization devices comprises energy storage means and means storing energy therein during each of said bursts.

8. An electrical system comprising a control assembly, a plurality of controlled assemblies, and means providing a single electrically conducting path interconnecting said assemblies;

said control assembly comprising a source of alternating voltage of a selected frequency and means connected to said source for supplying therefrom to said path a train of spaced bursts of electrical energy of said frequency, and each of said controlled assemblies comprising a utilizing device, means connected to said path for storing energy throughout said bursts, and means connected to said path for causing discharge of the stored energy through said device at a selected point in the duration of each burst.

9. Apparatus according to claim 8 in which the duration of the discharge is short compared with the length of the bursts.

* * * * *